(No Model.)

2 Sheets—Sheet 2.

C. C. BURTON.
INJECTOR AND EXTRACTOR.

No. 338,710. Patented Mar. 30, 1886.

WITNESSES:
Edwin H. Risley
Andrew R. Bennett

Charles C. Burton
INVENTOR.

United States Patent Office.

CHARLES COE BURTON, OF UTICA, NEW YORK.

INJECTOR AND EXTRACTOR.

SPECIFICATION forming part of Letters Patent No. 338,710, dated March 30, 1886.

Application filed April 27, 1885. Serial No. 163,532. (No model.)

*To all whom it may concern:*

Be it known that I, CHARLES COE BURTON, residing at the city of Utica, in the county of Oneida and State of New York, have invented a new and useful Improvement in Injector and Extractor, of which the following is a specification.

My present invention relates to an injector and extractor for injecting and extracting water or other fluids into or taking the same out of a tank or other receptacle; and it consists in the arrangement and application of the various mechanical combinations hereinafter pointed out and claimed.

Figure 1:
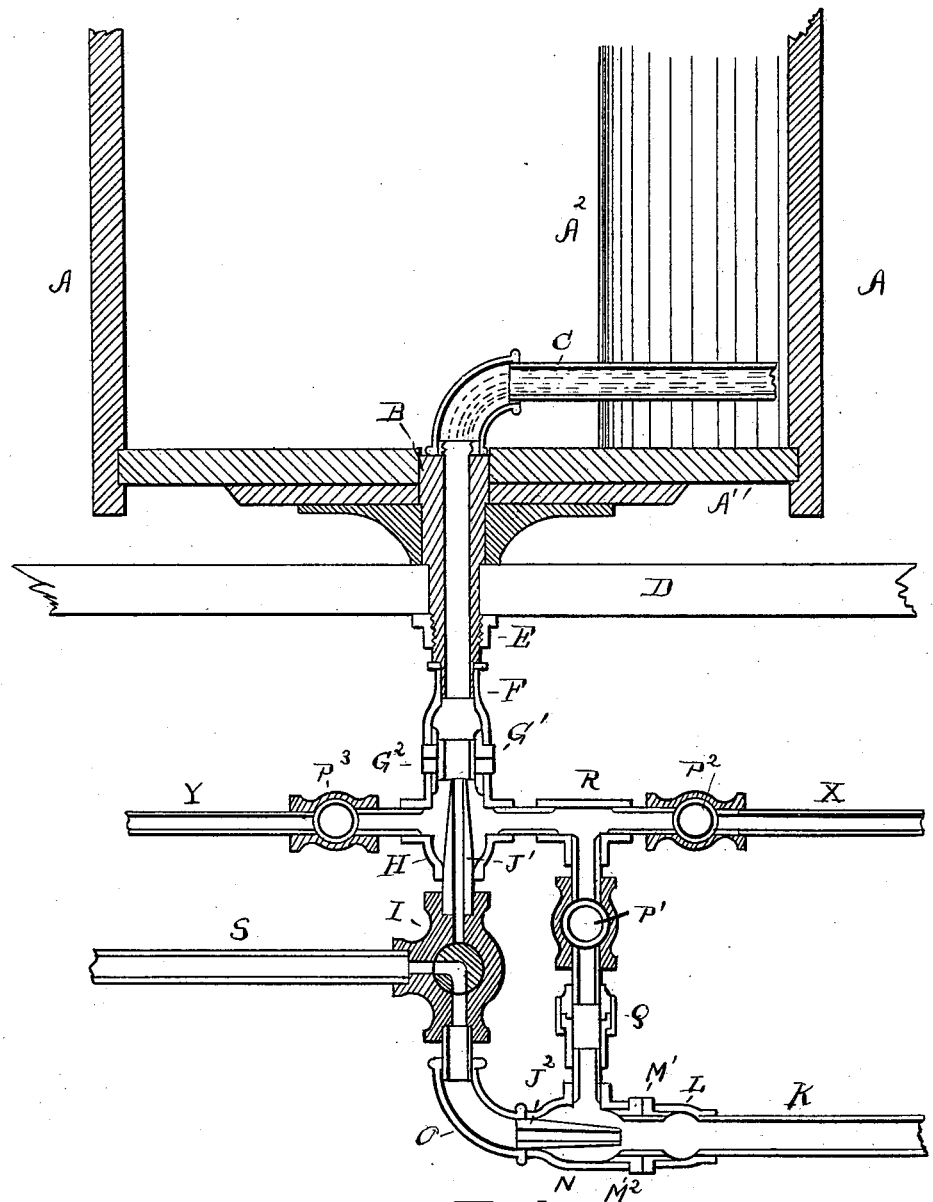
Figure 2:
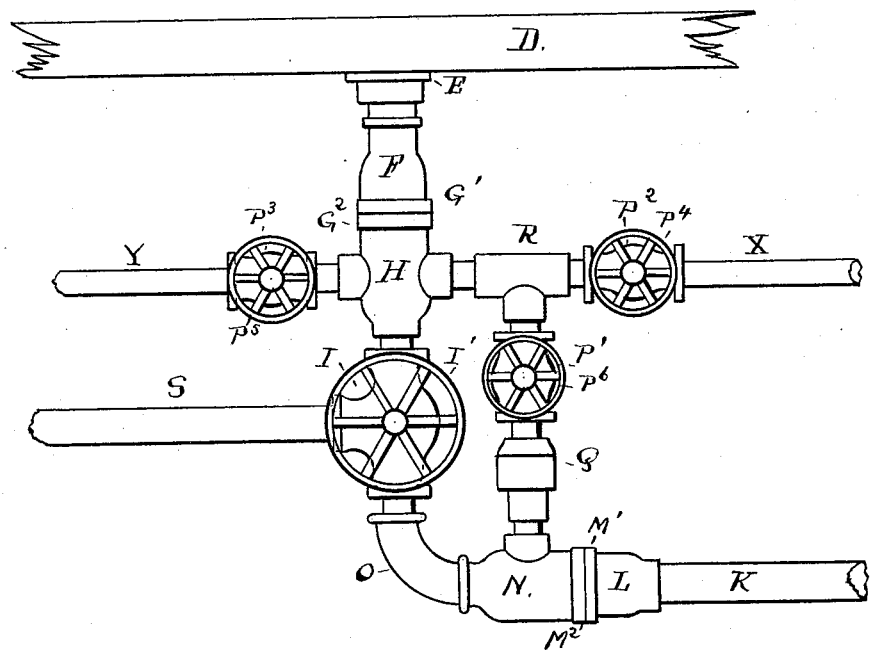

In the accompanying drawings, Figure 1 represents a vertical section of my injector and extractor as applied to the rotating cylinder of a washing-machine, which is shown in section. Fig. 2 is a front view of my improved injector and extractor as applied to a tank or other receptacle, the wall of which is shown in section.

In Fig. 1 in the accompanying drawings my improved injector and extractor is represented as applied to the rotating cylinder of a washing-machine. The steam, water, or other fluids are injected into or extracted from the rotating cylinder through a hollow stud, which forms one bearing for the rotating cylinder. I do not, however, claim the hollow stud as my invention. My injector and extractor may be applied with equal facility to a stationary tank or receptacle for water or other fluids, which may be heated by conducting steam through my injector into the tank or receptacle containing fluid to be heated, and with the arrangement of the various pipes hereinafter described water, steam, and other fluid may be injected into the receptacle, and by reversing the current of steam and the fluid-valve the flow may be established in the opposite direction, whereby the contents of the tank or receptacle may be extracted, as hereinafter more fully pointed out, which device is claimed broadly.

In the accompanying drawings, A represents the sides of a rotating cylinder. A' represents the head. A² represents the water-line.

It is apparent that my invention will work equally well if the cylinder is filled with water or other liquid.

B represents a tubular shaft or bearing on which cylinder A revolves. The steam, water, or other liquid is injected into the cylinder or extracted from it through this tubular bearing.

C represents a pipe attached to the tubular bearing, and projects downward with the opening at the bottom, so that the water or other liquid will cover the end of the pipe when the cylinder is rotated.

D represents a section of the frame for supporting the cylinder and tubular bearings, which is held secure by jam-nut E, working on suitable screw-threads.

F represents a reducer for connecting with the tubular bearing and shaft B.

G' represents a nut or coupling for holding the pipe in union. G² represents a similar nut connected to nut G' by screw-threads on a nipple attached to nut G'.

H represents a four-way coupling. A coupling having three or more ways may be used. One end of the coupling is connected to a pipe leading into the receptacle by reducing nut G², for forming a steam and fluid passage to and from the receptacle. The opposite way is connected by means of a connecting-pipe with a three-way steam-pipe coupling. A chamber is formed in the four-way coupling, into which a projecting pipe or nipple, J', extends, which pipe or nipple is connected with the three-way coupling. The opposite arms of the four-way coupling are connected with pipes X Y, which connect with water or other fluid, which is allowed to pass into the chamber in the four-way coupling surrounding the nipple J', which is provided with a sufficient space to allow a proper flow of water or other liquids. One or more pipes connecting with one or more fluid-tanks may be connected with the four-way coupling without departing from the spirit of my invention. Each of the pipes connecting with the four-way cock represented by X and Y should be controlled by valves, preferably operated by hand-wheels P² and P³, for regulating the flow of fluids or cutting the same off.

I represents a three-way coupling, one of said ways connecting with the four-way coupling H and the opposite way with pipe O, and the third way connecting with the steam-generator. This three-way coupling should be provided with a valve, preferably operated by hand-wheel I', for controlling the direction and pressure of the steam.

N represents a three-way coupling, one end connecting with pipe O and the steam passage-way into and through the four-way coupling H, and the opposite end of the coupling connected with supply or discharge pipe K, which connects with a fluid-receptacle. The opposite arm of the three-way coupling is connected by pipe Q with pipe X by means of a three-way coupling, R. It is quite obvious that instead of this three-way coupling an elbow may be formed and pipe X omitted without departing from the spirit of my invention. Pipe Q should be controlled by a valve, preferably operated by hand-wheel P', for controlling or regulating the passage of fluids. Nipple or projecting pipe J$^2$, connecting with pipe O, for forming a steam passage-way, is projected into a chamber in the three-way coupling N, which forms a chamber surrounding the end of the nipple. The flow of steam may be directed through the passage-way in either direction by shifting the valve operated by hand-wheel I'.

M and M' represent an ordinary reducing section of a steam-pipe.

Operation: For injecting steam and other liquids, the valve controlling the passage in the three-way cock I, operated by hand-wheel I', is turned so as to allow the steam to pass to the right through the connecting-pipe into the tank to be heated. The passage of the steam and water, or the steam separately, through nipple J', extending into the opening in the four-way cock, produces a vacuum in the space surrounding the tapering pipe or nipple, thereby producing a vacuum in the direction of the flow of steam, or of the steam and water, which vacuum, when established, is accelerated by the steam-pressure or the flow of water and steam against the flowing current. To accomplish this the valve controlled by hand-wheel P$^2$ should be turned in such manner as to allow the flow of water or other liquids through the supply-pipe into the recess surrounding nipple J' in the four-way cock, into which the liquid rushes to supply the vacuum created by the steam passing through the nipple. For supplying any other liquid and for producing a mixture, pipe Y should be connected therewith, and by opening the valve controlled by hand-wheel P$^3$, the flow being induced by the pressure of steam creating the vacuum in the chamber surrounding nipple J'.

For extracting the fluid from a cylinder or other receptacle, the valve in the three-way cock I, controlled by hand-wheel I', is opened to allow the steam to pass to the left. Valves controlled by hand-wheels P$^2$ and P$^3$ should be closed. The pressure of the steam through tapering pipe or nipple J$^2$ creates a vacuum in the chamber surrounding the same, whereby a current in the direction of the steam is created, which is accelerated by the continuous pressure in the direction of the flow created by the rush of water to fill the vacuum.

It is quite obvious that the form and variation in the connecting-pipe may be changed without departing from the spirit of my invention.

What I claim as new, and desire to secure by Letters Patent, is—

1. The combination, in a steam and fluid injector of the character described, of the fluid and steam passage-ways uniting in a chamber surrounding the union of the ways, the steam passage-way projecting into the chamber, and the valve for controlling the steam passage-way for changing the direction of the steam-pressure, and controlling the same in the direction of the discharge which connects with the chamber, whereby an injector may be used as an extractor, substantially as described.

2. The combination, in a steam and fluid injector of the character described, of separate steam and fluid passage-ways uniting in a chamber surrounding the union of the ways on the opposite side of the steam-supply pipe from the injector, and a valve for controlling the steam passage-way between the steam-supply pipe and the injector, for changing the direction of the steam-pressure toward the discharge-pipe connecting with the chamber, whereby an injector may be used as an extractor.

3. The combination, in an injector of the character described, of a separate steam and fluid passage-way uniting in a chamber surrounding the union of the ways, into which chamber the steam passage-way projects, and a valve for controlling the steam passage-way, constructed to turn the steam-pressure in the direction of the discharge-pipe connected with said chamber, whereby an injector may be used as an extractor, substantially as described.

4. The combination, in an injector of the character described, of a separate steam and fluid passage-way uniting in a chamber surrounding the union of the ways, which chamber has a discharge-pipe, a valve for controlling the steam passage-way, constructed to turn the steam-pressure in the direction of the discharge-pipe, and a valve for controlling the fluid-pipes leading to the injector, constructed to shut off the fluid from the main channel, arranged substantially as described, whereby an injector may be used as an extractor.

5. The combination of separate steam and water passage-ways uniting in chambers located on opposite sides of the steam-supply pipe, each chamber having an outlet, and a valve for controlling the steam passage-way, constructed to change the direction of the steam-pressure in either direction, whereby the same may be used as a steam and fluid injector and a steam and fluid extractor.

6. The combination of separate steam and water passage-ways uniting in chambers located on opposite sides of the steam-supply pipe, the steam pipe or passage-way projecting into the chambers, and a valve for controlling the steam passage-way, constructed to shut off the steam-pressure in one direction, allowing the same to operate in the opposite direction, substantially as described, whereby an injector may be converted into an extractor.

CHARLES COE BURTON.

Witnesses:
EDWIN H. RISLEY,
ANDREW R. BENNETT.